(12) United States Patent
Nakamura et al.

(10) Patent No.: US 7,225,588 B2
(45) Date of Patent: Jun. 5, 2007

(54) DAMPING BRACE AND STRUCTURE

(75) Inventors: Hiroshi Nakamura, Yachiyo (JP); Kazuaki Suzuki, Tokyo (JP); Yasuhiro Nakata, Chiba (JP); Takashi Shirai, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 226 days.

(21) Appl. No.: 10/883,937

(22) Filed: Jul. 2, 2004

(65) Prior Publication Data
US 2005/0005539 A1   Jan. 13, 2005

(30) Foreign Application Priority Data
Jul. 8, 2003 (JP) ............................... 2003-193274

(51) Int. Cl.
E04B 1/98 (2006.01)
E04H 9/02 (2006.01)
E04C 3/34 (2006.01)

(52) U.S. Cl. .................... 52/167.3; 52/167.1; 52/724.5; 52/723.1

(58) Field of Classification Search ............... 52/167.3, 52/731.7, 167.1, 724.5, 723.1
See application file for complete search history.

(56) References Cited

U.S. PATENT DOCUMENTS 5,471,810 A * 12/1995 Sugisawa et al. .......... 52/731.7
6,826,874 B2 * 12/2004 Takeuchi et al. ........... 52/167.3

FOREIGN PATENT DOCUMENTS

| JP | 0419121 | 4/1992 |
|---|---|---|
| JP | 053402 | 1/1993 |
| JP | 05009977 | 1/1993 |
| JP | 0557111 | 7/1993 |
| JP | 07229204 | 8/1995 |
| JP | 09268802 | 10/1997 |
| JP | 10037515 | 2/1998 |
| JP | 01227192 | 8/2001 |
| JP | 2002-256728 | 9/2002 |
| TW | 459837 | 10/2001 |

OTHER PUBLICATIONS

A Study of Seisic Resistant Performance of Energy-Dissipating BRBF, *Structural Engineering*, vol. 17, No. 2, Jun. 2002, pp. 3-22 w/English Translation.
First Office Action in couterpart Chinese Patent application w/translation.
Office Action (and English Translation) issued in Taiwanese Application 093120123 on Sep. 25, 2006.

* cited by examiner

Primary Examiner—Janet M. Wilkens
Assistant Examiner—Timothy M. Ayres
(74) Attorney, Agent, or Firm—Baker Botts LLP

(57) ABSTRACT

A damping brace having an axial force member for providing bearing forces against tensile or compressive forces, a constraining member for constraining the axial force member, and a stiffening part for supplementing the stiffness of the axial force member. An adhesion preventive coating is provided for preventing adhesion between the constraining member and the stiffening part. A length of the stiffening part extending along the axial direction and the gap between the stiffening part and the constraining member are defined in such a way as to prevent an end of the axial force member from rotating in the axial direction beyond a specific angle when the compressive force is applied to the force member.

7 Claims, 14 Drawing Sheets

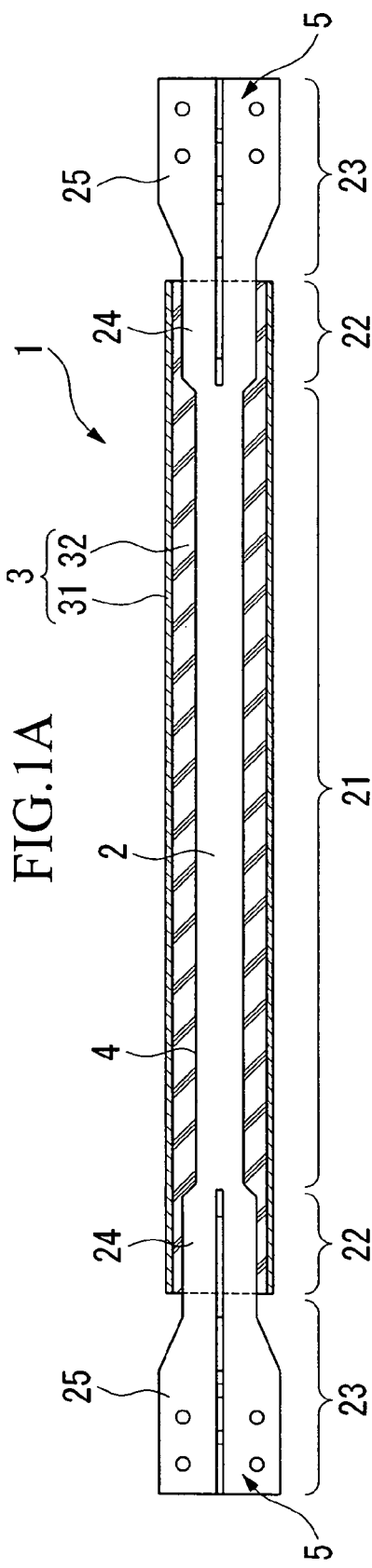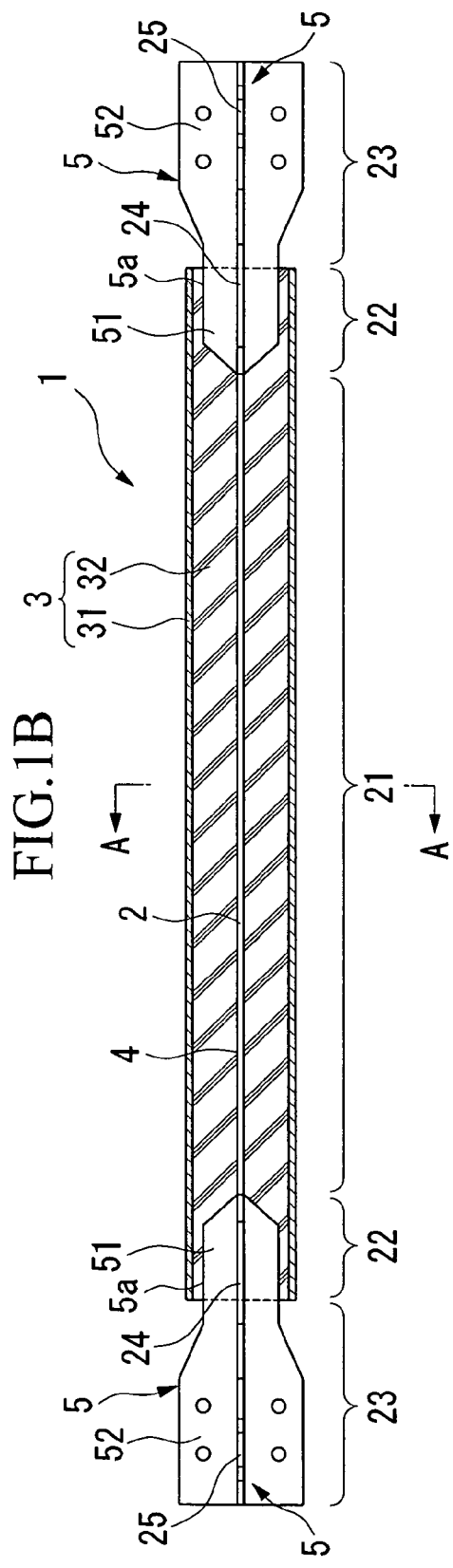

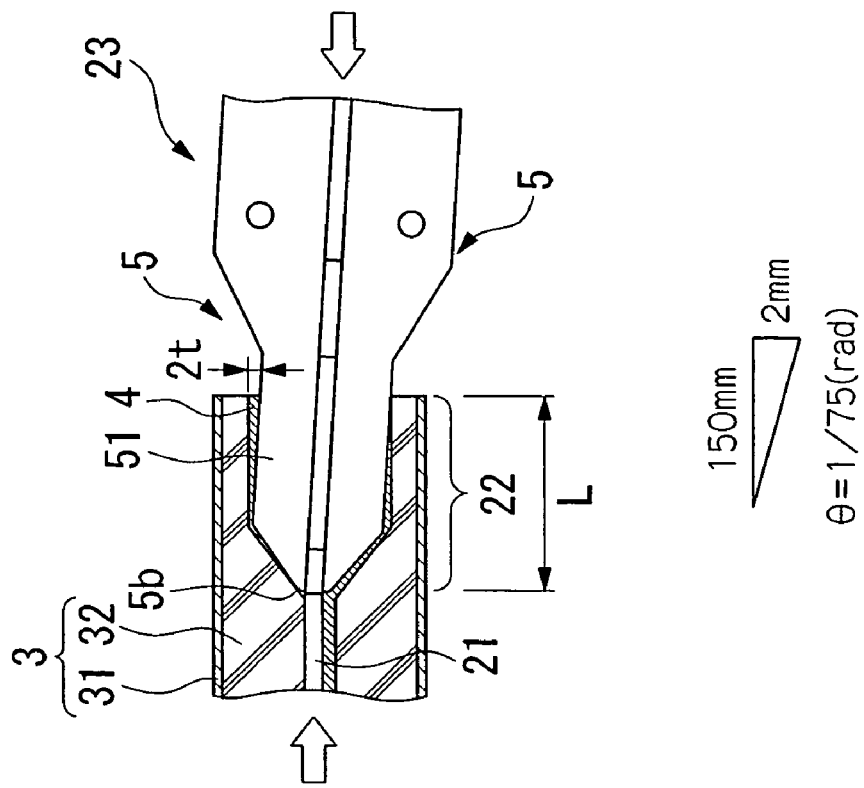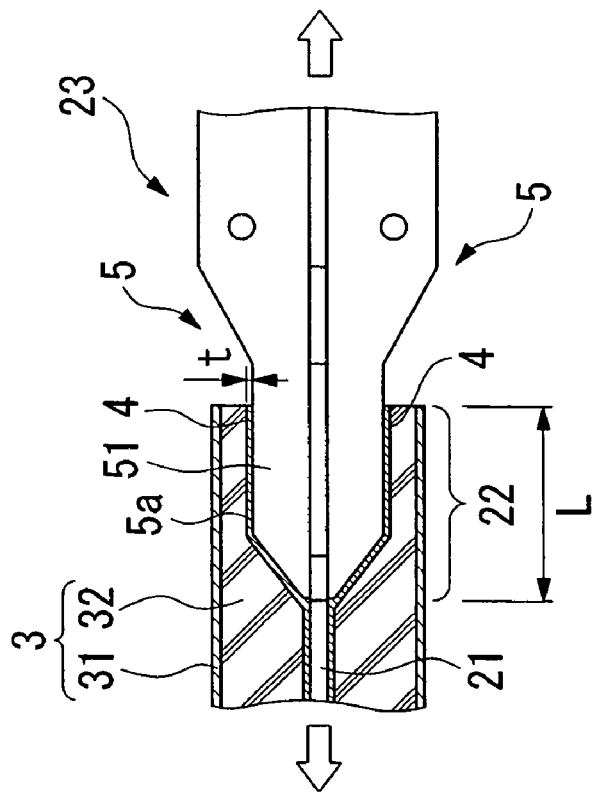

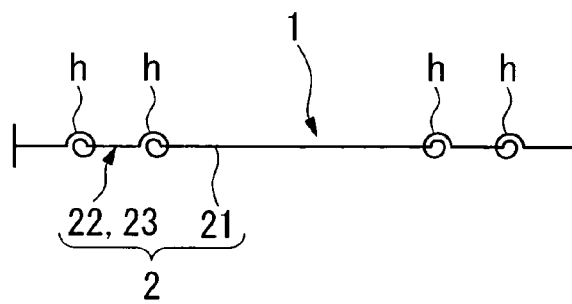
FIG.5A
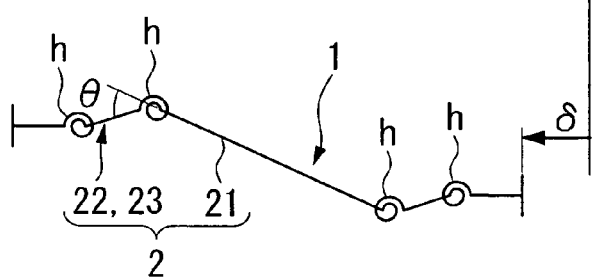
FIG.5B
FIG.6
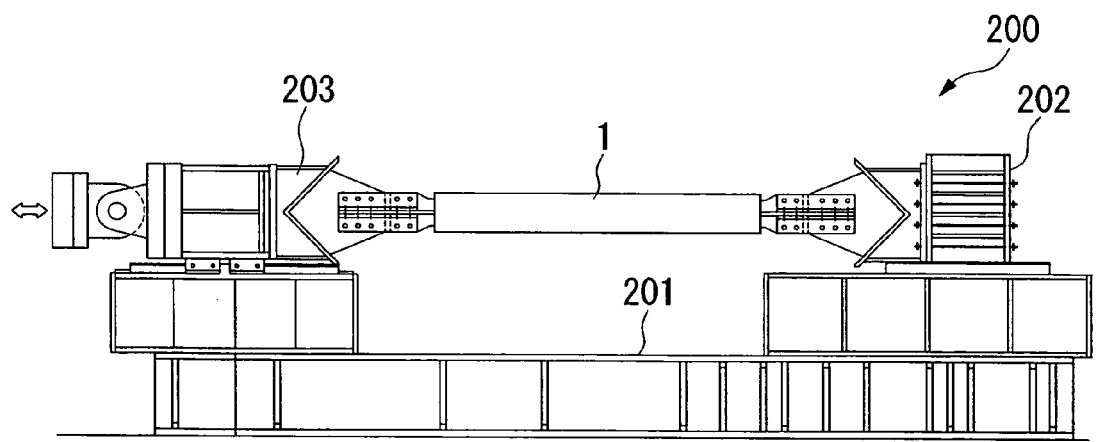

DAMPING BRACE AND STRUCTURE

CROSS-REFERENCE TO RELATED APPLICATION(S)

The present application claims priority under 35 U.S.C. § 119 from Japanese Patent Application No. 2003-193274, filed on Jul. 8, 2003, the entire disclosure of which is incorporated herein by reference.

FIELD OF THE INVENTION

The present invention relates to a damping brace that deforms itself to absorb vibrational energy applied to a building structure from earthquakes, winds and the like, and a structure which includes such brace.

BACKGROUND INFORMATION

A typical conventional damping brace may include a steel axial force member, a constraining member for preventing buckling of the axial force member, and an adhesion preventive coating for preventing adhesion between the constraining member and the axial force member. The axial force member may include a yielding part for deforming yielding when a tensile force or a compressive force that exceeds a specified magnitude is applied, a stiffening part for stiffening an end of the axial force member that protrudes from the constraining member, being covered together with the yielding part by the constraining member, and a joint part that is jointed to the structure.

The damping brace is generally installed diagonally in the plane of the structure, which is constructed in a rectangular shape by columns and beams, where each end of the axial force member is fastened to a welded gusset plate with bolts.

When a vibrational energy due to earthquakes, winds or the like is applied to a structure that may include the damping brace, a tensile force or a compressive force is applied on the axial force member, whereupon the yielding part deforms in the tensile direction (or a compressive direction), and in this manner absorbing the energy.

Studies concerning such a damping brace have been made to prevent local buckling of the axial force member by specifying the thickness and stiffness of the coating that prevents the adhesion between the hardened concrete and the axial force member as described by Japanese Patent Application 2001-227192, the entire disclosure of which is incorporated herein by reference.

In addition, the above-type arrangements generally undergo various studies and tests to verify whether they would deform according to the expected parameters in response to vibrational energy. However, generally, no verification is performed with regard to a buckling deformation of the joint between the damping brace and the structure. It has been ascertained that, in order to have the damping brace produce a damping effect according to expected parameters, it may be important to clarify the problem of the hinge phenomenon that occurs at the external portion(s) of the axial force member when the damping brace is subjected to compressive forces. If one or more external portion(s) of the axial force member undergo a hinge phenomenon and exhibit unstable behavior, the damping brace would likely not be designed to have the stiffness and yield strength, and may become unable to adequately absorb the vibrational energy.

Such hinge phenomenon is shown in FIGS. 17(A)–17(C). As shown in FIG. 17(A), a damping brace 100 is equipped with an axial force member 101 and a constraining member 102. The axial member 101 has a yielding part 103 and a stiffening part 104.

When excessive compressive forces act on damping brace 100, an end of axial force member 101 protruding from constraining member 102 (i.e., the part stiffened by stiffening part 104) may deform in a direction outside the plane of the structure frame (i.e., a direction perpendicular to the plane of the structure). In particular, as shown in FIG. 17(B) and FIG. 17(C), the end of axial force member 101 deforms as if a hinge rotates around the area of the boundary between yielding part 103 and stiffening part 104, while compressing the adhesion preventive coating (not shown). This phenomenon is generally referred to as the hinge phenomenon and the condition wherein a yielding is caused in the end of axial force member 101 to cause it to bend is expressed as "a hinge H is formed."

The hinge phenomenon in the vicinity of the boundary between yielding part 103 and stiffening part 104 does not actually occur as long as the joint part between the end of axial force member 101 and gusset plate 110 has a sufficient stiffness, but a similar hinge phenomenon can occur surrounding the boundary area between the end of axial force member 101 and gusset plate 110 if a compressive force exceeding the stiffness of this part is applied. Under a condition where hinge phenomena can occur in the vicinity of the boundary between yielding part 103 and stiffening part 104, as well as the end of axial force member 1101 and gusset plate 110, three or four hinges H can be formed in damping brace 100, making the performance of damping brace 100 unstable.

SUMMARY OF THE INVENTION

The damping brace according to an exemplary embodiment of the present invention includes an axial force member which provides yield strength against tensile or compressive forces acting in the axial direction. A constraining member is also provided which is arranged over the periphery of the axial force member and constrains the axial force member. Further, a stiffening part is provided on the external portion(s) of the axial force member and increases the stiffness of the axial force member; and an adhesion-preventing coating which is provided between the constraining member and the stiffening part and prevents adhesion between them. The length of the stiffening part in the axial direction and the size of the gap between the stiffening part and the constraining member are such that the external portion(s) of the axial force member will not rotate beyond a certain angle relative to the axial direction when the axial force member is subjected to the compressive forces.

The stiffening part can be used to increase the stiffness of the external portion(s) of the axial force member, but when the axial force member undergoes a hinge phenomenon as described above. The external portion(s) of the axial force member exhibit unstable behavior, and the damping brace cannot provide the stiffness and yield strength intended in the design and becomes unable to adequately absorb the vibrational energy. The hinge phenomenon described above can be prevented by providing a gap between the constraining member and the stiffening part. A gap may be used between the constraining member and the stiffening part since if there is no gap between these elements, the axial force member may not be able to function as expected. Accordingly, the exemplary embodiment according to the present invention may define the length of the stiffening part in the axial direction and the size of the gap between the stiffening part and the constraining member so as to keep the external portion(s) of the axial force member from rotating beyond a certain angle relative to the axial direction when the axial force member is subjected to compressive forces. As a result, no hinge phenomenon would likely occur at the external portion(s) of the axial force member and the external portion(s) of the axial force member do not exhibit unstable behavior, allowing the axial force member to provide the stiffness and yield strength intended in the design and making it possible to adequately absorb the vibrational energy.

For the damping brace according to an exemplary embodiment of the present invention, it may preferable that the certain angle be specified as 1/75 rad (radians) and that the length of the stiffening part in the axial direction be set at no less than 150 mm (millimeters). If the angle of rotation allowed for the external portion(s) of the axial force member is at most 1/75 rad, no hinge phenomenon would likely occur at the external portion(s) of the axial force member, and the external portion(s) of the axial force member will not exhibit unstable behavior. Furthermore, if the length of the stiffening part in the axial direction is shorter than 150 mm, end breakage of the axial force member will likely occur.

The size of the gap between the above-described constraining member and stiffening part in the damping brace of the exemplary embodiment of the present invention may be preferably set at nor more than 1 mm (millimeter).

If the size of the gap between the constraining member and the stiffening part is more than 1 mm, if the allowable angle of rotation of the external portion(s) of the axial force member is at most 1/75 rad, no hinge phenomenon will occur, but when the gap between the constraining member and the stiffening part may become overly large, the constraining member will likely cease to perform its expected function. A pin coupling that is joined to the structure can be preferably provided at the external portion(s) of the axial force member in the damping brace of the exemplary embodiment of the present invention.

In the structure of another exemplary embodiment of the present invention, the damping brace of the present invention can be installed on a rigid framework consisting of columns and beams. In addition or in the alternative, the damping brace can be preferably joined to the framework using pins. If the structure and damping brace are rigidly joined, for instance by using a splice plate, when the rigid frame structure consisting of columns and beams undergoes interstory deformation, a bending moment may be generated at the external portion(s) of the axial force member secured to the splice plate, causing rotational deformation of the external portion(s) of the axial force member. Since the expected function of the axial force member is to provide yield strength against tensile forces and compressive forces acting in the axial direction, by providing a pin coupling at the external portion(s) of the axial force member and joining it to the structure with pins, no bending moment will be generated at the external portion(s) of the axial force member even when the structure undergoes interstory deformation.

BRIEF DESCRIPTION OF THE DRAWINGS

FIG. 1(A) is a vertical cross-sectional view of a first exemplary embodiment of the damping brace according to the present invention.

FIG. 1(B) is a horizontal cross-sectional view of the first embodiment shown in FIG. 1(A).

FIG. 1(C) is a cross-sectional view along the A—A line of the embodiment shown in FIG. 1(B).

FIG. 4(A) is a status description diagram showing a performance of an end of the axial force member when a tensile force is applied on the damping brace according to the first embodiment of the present invention.

FIG. 4(B) is a status description diagram showing the performance of the end of the axial force member when a compressive force is applied on the damping brace.

FIG. 5(A) is a schematic diagram showing the performance of the damping brace when no force is applied thereupon.

FIG. 5(B) is a schematic diagram showing the performance of the damping brace when a compressive force is applied thereupon.

FIG. 6 is a front view showing the structure of a load bearing device used in the loading test of the damping brace.

DETAILED DESCRIPTION

First Exemplary Embodiment

Figure 2:
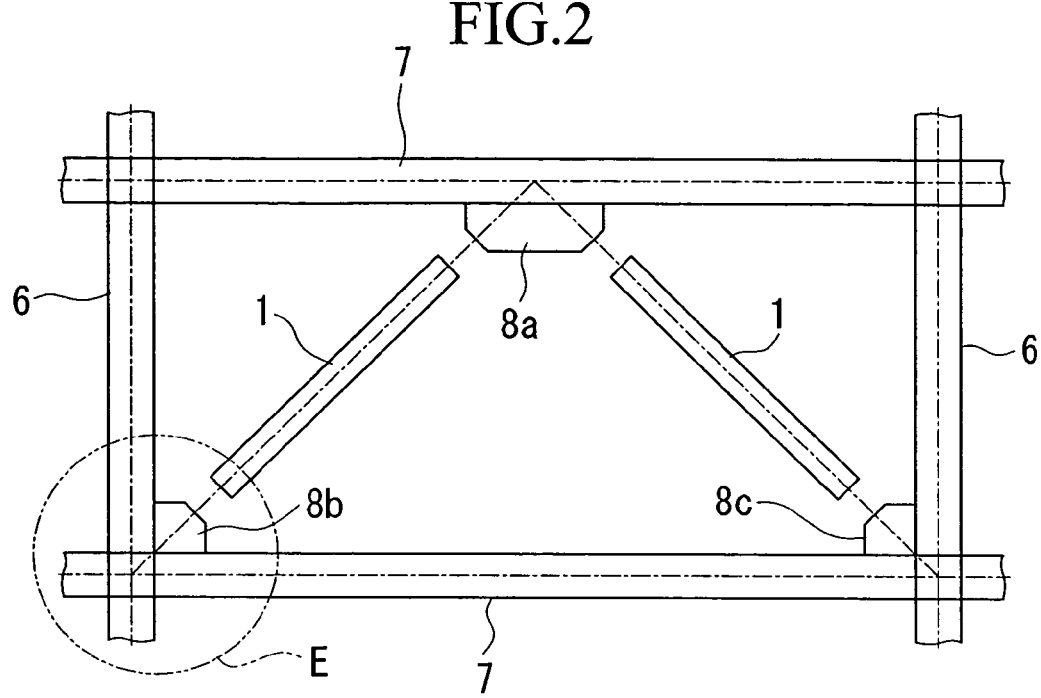
FIG. 2 is a front view schematically showing the first embodiment of the structure of the present invention.

A damping brace 1, as shown in FIGS. 1(A)–(C), includes an axial force member 2 which provides yield strength against tensile or compressive forces acting in the axial direction, and a constraining member 3 which is provided over the periphery of the axial force member 2 and constrains the axial force member 2. Between the axial force member 2 and constraining member 3, an adhesion-preventing coating 4 is provided, which can prevent the adhesion therebetween.

The axial force member 2 is covered by constraining member 3, and includes a yielding part 21 which undergoes yielding and absorbs energy when subjected to tensile or compressive forces above a certain magnitude. The axial force member 2 also includes a stiffening part 22 which increases the stiffness of the yielding part 21 protruding from the constraining member 3; and a coupling part 23 which is provided on the outside of the stiffening part 22 and is joined to the structure.

The axial force member 2 may be formed from a single steel sheet of uniform thickness, and the yielding part 21 is provided approximately at the middle of the axial force member 2. At the external portion(s) of the yielding part 21, a first widened part 24 that is wider than the yielding part 21 is provided, and a second widened part 25 wider than the first widened part 24 is furthermore provided on the outside of the first widened part.

Stiffening ribs 5 are provided along the first and second widened parts 24 and 25 at both external portion(s) of the axial force member 2. The stiffening ribs 5 can be formed from steel sheet of uniform thickness just like the axial force member 2, and are arranged along the stiffening part 22 and coupling part 23 on both lateral surfaces of the axial force member 2 and are welded in the axial direction at the portion which lies against the axial force member 2. In the portion of the stiffening rib 5 that extends along the first widened part 24, a third widened part 51 is provided, which together with the first widened part 24 forms the above-described stiffening part 22, and in the portion of the stiffening rib 5 that runs along the second widened part 25, there is provided a fourth widened part 52, which is wider than the third widened part 51 and together with the second widened part 25 forms the coupling part 23.

The constraining member 3 includes a reinforcing steel tube 31 arranged at the periphery of the axial force member 2, and a concrete member 32, which is cast between the steel, a tube 31 and the axial force member 2, and cured. An adhesion-preventing coating 4 is applied to the surface of the axial force member 2 prior to casting the concrete 32, preventing adhesion between the axial force member 2 and the concrete 32 after the concrete member 32 is cured.

The adhesion-preventing coating 4 may consist of viscoelastic plastic materials, coating materials, etc., which are coated over the surface of the axial force member 2. The adhesion-preventing coating 4 not only prevents adhesion between the axial force member 2 and the constraining member 3, but also allows the deformation of the axial force member 2 that occurs through expansion of the cross-section when compressive forces act upon the axial force member 2. Providing the adhesion-preventing coating 4 may cause the axial force member 2 covered at its periphery by the constraining member 3 to be spaced away from the concrete 32 by the thickness of the adhesion-preventing coating 4. Since, as described above, the adhesion-preventing coating 4 is applied to the surface of the axial force member 2 prior to casting the concrete 32, the gap between the concrete 32 and the surface of the axial force member 2 covered by the constraining member 3 depends on the thickness of the adhesion-preventing coating 4 that is applied in advance. In this connection, in the damping brace 1 of this exemplary embodiment of the present invention, the gap between the lateral edge 5a of the stiffening rib 5 and the concrete element 32 can be controlled by increasing the precision of application of the adhesion-preventing coating 4 and the like.

FIG. 2 illustrates a structure in which the damping brace 1 according to the exemplary embodiment of the present invention that is configured as described above is installed. This exemplary structure uses a rigid frame structure which includes steel columns 6 and beams 7, and two damping braces 1 are installed between each pair of stories of this structure. The top end joint of one of the damping braces 1 is bolted to a gusset plate 8a that is welded to approximately the middle of the beam 7 of the upper story, while the bottom end joint is bolted to a gusset plate 8b that is welded to the joint between one of the columns 6 and the beam 7 of the lower story. The top end joint of the other damping brace 1 is bolted to the mentioned above gusset plate 8a, and the bottom end joint is bolted to a gusset plate 8c that is welded to the joint between the other column 6 and the beam 7 of the lower story. Both damping braces 1 are arranged such that plane of the axial force member 2 is made parallel with the plane formed by the columns 6 and beams 7, i.e., the planes are aligned.

Figure 3:
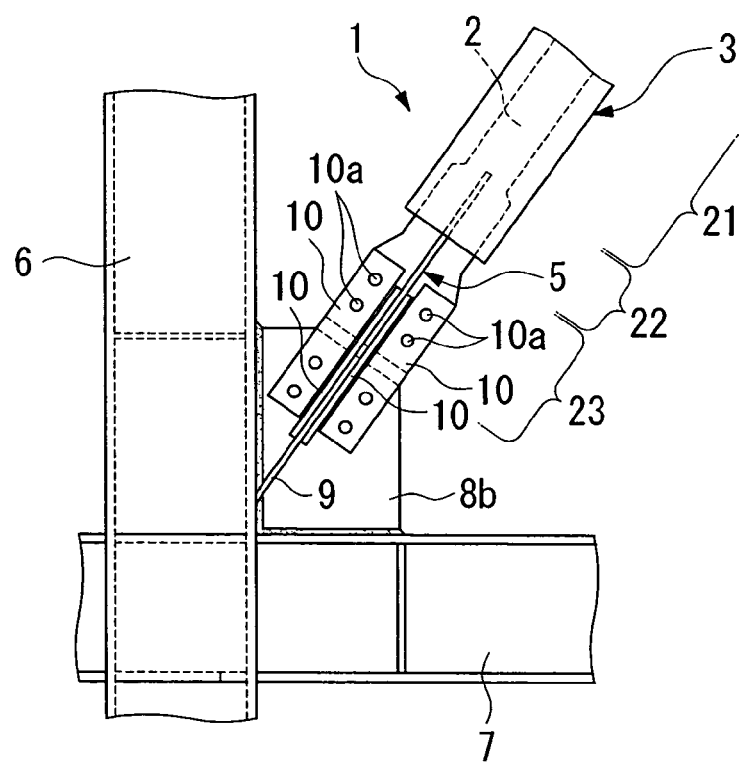
FIG. 3 is a front view showing the joint area between the damping brace and the structure of the first embodiment.

FIG. 3 illustrates exemplary details of the area where the lower coupling part 23 of the damping brace 1 is bolted to the gusset plate 8b (e.g., the area indicated by the symbol E in FIG. 2). In FIG. 3, an out-of-plane rib 9 is welded to the gusset plate 8b so as to extend down to the column 6. The axial force member 2 and the gusset plate 8b are tied together with bolts 10a, using two sets of paired splice plates 10 which sandwich the sides of the stiffening ribs 5 at two locations. The stiffening ribs 5 and the out-of-plane rib 9 are likewise coupled together with bolts (not illustrated for the sake of clarity), using two sets of paired splice plates 10 which sandwich the sides of the axial force member 2 at two locations.

When a structure configured as described above is subjected to vibrational energy due to earthquake, wind or the like, tensile or compressive forces generally act upon the damping brace 1 in the axial direction. When the damping brace 1 receives these forces, the axial force member 2 undergoes yielding, thereby absorbing the vibrational energy.

When a tensile force acts upon the damping brace 1, as shown in FIG. 4(A), the axial force member 2 undergoes a deformation in the direction of stretching in plane, but does not undergo an out-of-plane deformation. When a compressive force acts upon the damping brace 1, as shown in FIG. 4(B), the yielding part 21 of the axial force member 2 can be displaced out of plane while the adhesion-preventing coating 4 is compressed, and then the external portion(s) of the axial force member 2 undergo rotational deformation out of plane. To describe this in further detail, while compressing the adhesion-preventing coating 4, the external portion (s) of the axial force member 2 undergo deformation centered on the boundary between the yielding part 21 and the stiffening part 22 (the area where the end Sb of the stiffening rib 5 that abuts on the yielding part 21 is arranged), similar to a rotation on a hinge. In a state where the damping brace 1 is subjected to compressive forces, the behavior of the end of the axial force member 2 depends on the bending stiffness of the axial force member 2 before the stiffening rib 5 contacts the concrete 32, and on the yield strength and stiffness of the steel tube 31 once the stiffening rib 5 has contacted the concrete 32, assuming that the shear forces on the concrete 32 are small enough. When the magnitude of the compressive force exceeds the limit of elastic deformation of the axial force member 2, the external portion(s) of the elastic member 2 undergo yielding, bending as if rotating on a hinge (the aforementioned hinge phenomenon).

The magnitude θ of the angle of rotation that occurs at the end of the axial force member 2 due to the action of compressive forces is determined as a function of the axial length L of the stiffening part 22 covered by the constraining member 3, and the size t of the gap between the lateral edge 5a of the stiffening rib 5 and the concrete 32. That is, the magnitude of the angle of rotation θ that occurs at the end of the axial force member 2 is expressed as 2 t/L rad (radians), becoming smaller when the axial length L of the stiffening part 22 covered by the constraining member 3 is longer, and greater when it is shorter. Furthermore, the magnitude of the angle of rotation θ that occurs at the end of the axial force member 2 can become smaller when the gap between the lateral edge 5a of the stiffening rib 5 and the concrete 32 is smaller, and becomes greater when the gap is larger.

It may be preferably to prevent a hinge from being formed at the external portion(s) of the axial force member 2 even when subjected to excess compressive forces, in the damping brace 1 of the present embodiment (based on the experimental results described below). To effectuate such prevention, the axial length L of the stiffening part 22 covered by the constraining member 3 may be provided to be no less than 150 mm (millimeters), and the size t of the gap between the lateral edge 5a of the stiffening rib 5 and the concrete 32 can be at most 1 mm (millimeter). By specifying the damping brace 1 as described above, the magnitude of the angle of rotation θ that occurs at the external portion(s) of the axial force member 2 to no more than 1/75 rad (radians) may be limited, and the formation of hinges at the external portion(s) of the axial force member 2 can be prevented.

Certain experiments on the damping brace 1 according to this exemplary embodiment of the present invention has been performed in order to arrive at the specification of the axial length L of the stiffening part 22 covered by the constraining member 3 and of the size t of the gap between the lateral edge 5a of the stiffening rib 5 and the concrete 32. Such experiment is described below.

The damping brace 1 was subjected to compressive and tensile forces to cause deformation of the damping brace 1, and the relationship between the axial deformation δ of the axial force member 2 and the magnitude of the angle of rotation θ occurring at the external portion(s) of the axial force member 2 has been reviewed. The axial deformation δ of the axial force member 2 and the angle of rotation θ occurring at the external portion(s) of the axial force member 2 are defined herein as follows. For example, starting from a state where the damping brace 1 maintains a linear shape, as shown in FIG. 5(A), a compressive force was applied to the damping brace 1 until a hinge h was formed and it assumed a bent state, as shown in FIG. 5(B). The resultant axial deformation of the axial force member 2 was designated as δ, and the angle formed by the stiffening part 22 and coupling part 23 relative to the yielding part 21 was designated as θ. No hinges h are actually formed in the damping brace 1 in the state as shown in FIG. 5(A), and hinges h have been indicated in the damping brace 1 of FIG. 5(A) to facilitate comparison with FIG. 5(B).

An exemplary loading device 200 used for the experiment is shown in FIG. 6. The loading device 200 includes, on a platform 201, a reaction jig 202 which remains at a fixed position and to which one end of the axial force member 2 is attached, and a loading jig 203 which is supported to be freely displaceable in the axial direction and to which the other end of the axial force member 2 is coupled. A jack (not illustrated) that is selectively made to exert compressive or tensile forced onto the damping brace 1 is coupled to the loading jig 203.

Figure 7A:
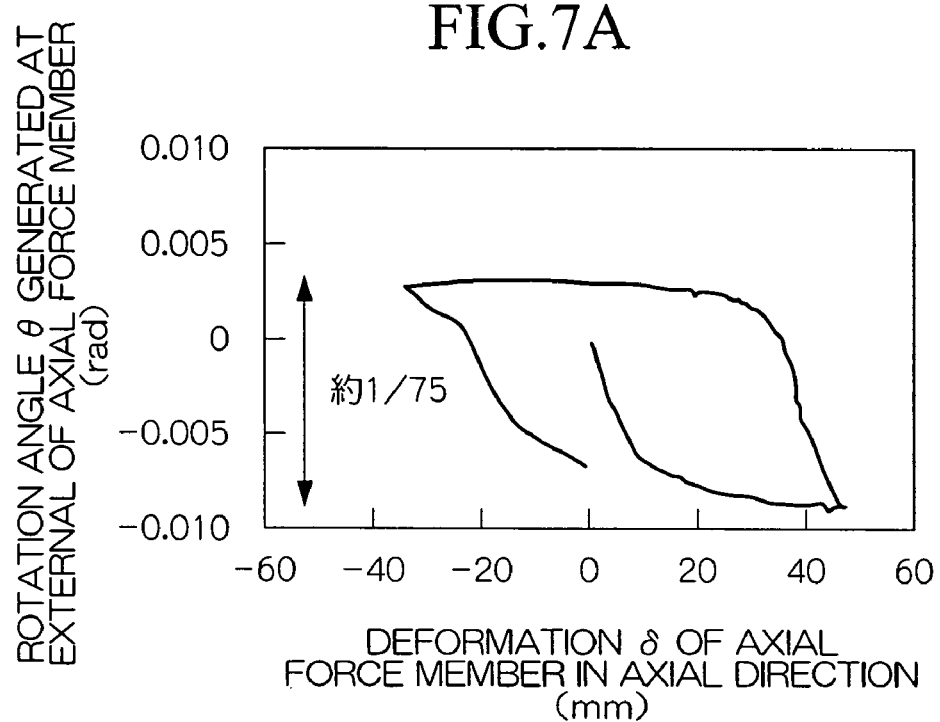
FIG. 7(A) is a graph showing a relation between the amount of deformation δ of the axial member in the axial direction and the rotation angle θ generated at the external portion(s) of the axial force member when compressive and tensile forces are applied to cause an axial strain of 4% in the axial force member.
Figure 7B:
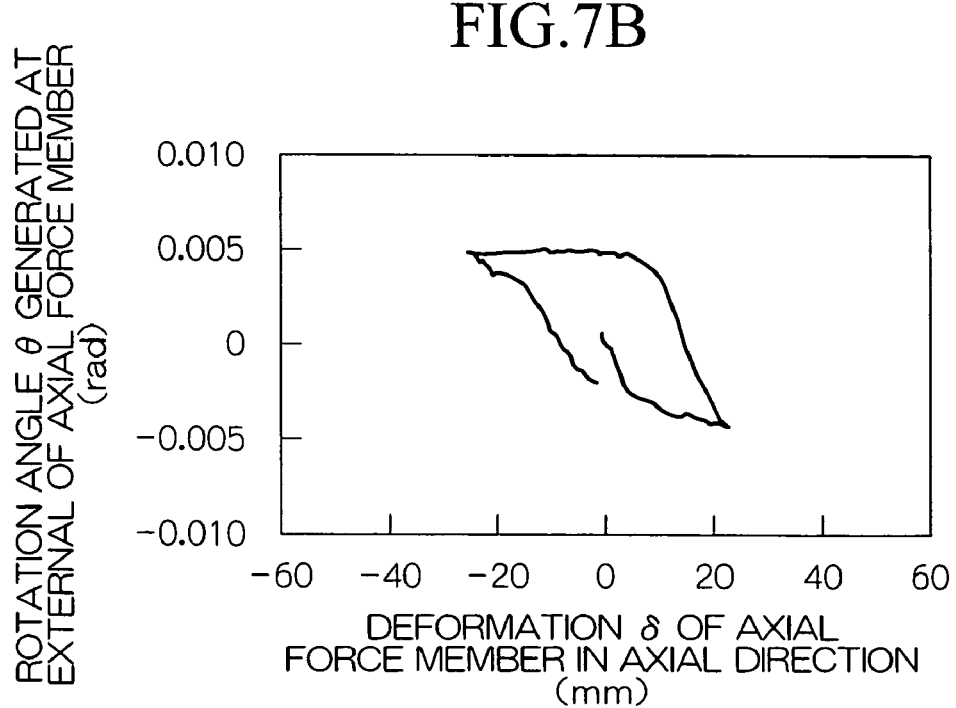
FIG. 7(B) is a graph showing the relation between the amount of deformation δ of the axial member in the axial direction and the rotation angle θ generated at the end of the axial force member when compressive and tensile forces are applied to cause an axial strain of 2% in the axial force member.

When the damping brace 1 was subjected to compressive and tensile forces with a 4% target axial strain of the axial force member 2, experimental results were obtained as shown in FIG. 7(A). When the damping brace 1 is subjected to compressive forces, even if the negative axial deformation increases to a certain extent, the magnitude of the angle of rotation θ occurring at the external portion(s) of the axial force member 2 will not increase above a certain level. When the damping brace 1 is subjected to tensile forces, assuming that the positive axial deformation is brought about by the initial strain of the axial force member 2, the magnitude of the angle of rotation θ occurring at the external portion(s) of the axial force member 2 is kept down to about 1/75 rad. This is due to the fact that the external portion(s) of the axial force member 2 are allowed to rotate only to the extent of the gap between the lateral edge 5a of the stiffening rib 5 and the concrete 32, with further rotation being constrained by the resistance of the concrete 32 and the steel tube 31. When the damping brace 1 was subjected to compressive and tensile forces with a 2% target axial strain of the axial force member 2, the same tendency as above was observed, although the axial deformation δ of the axial force member 2 was smaller, as shown in FIG. 7(B).

In the above-described experiment, the external portion(s) of the axial force member 2 did not bend and no hinges were formed in the axial force member 2. The loading conditions in the experiment corresponded to the case where interstory deformation of the structure is followed up over the entire plane of the axial force member, and the external portion(s) of the axial force member 2 are not subjected to any eccentric compressive forces. Furthermore, the adequate axial length L of stiffening part 22 covered by the constraining member 3 was also thought to be a factor in why no hinges were formed.

Figure 8:
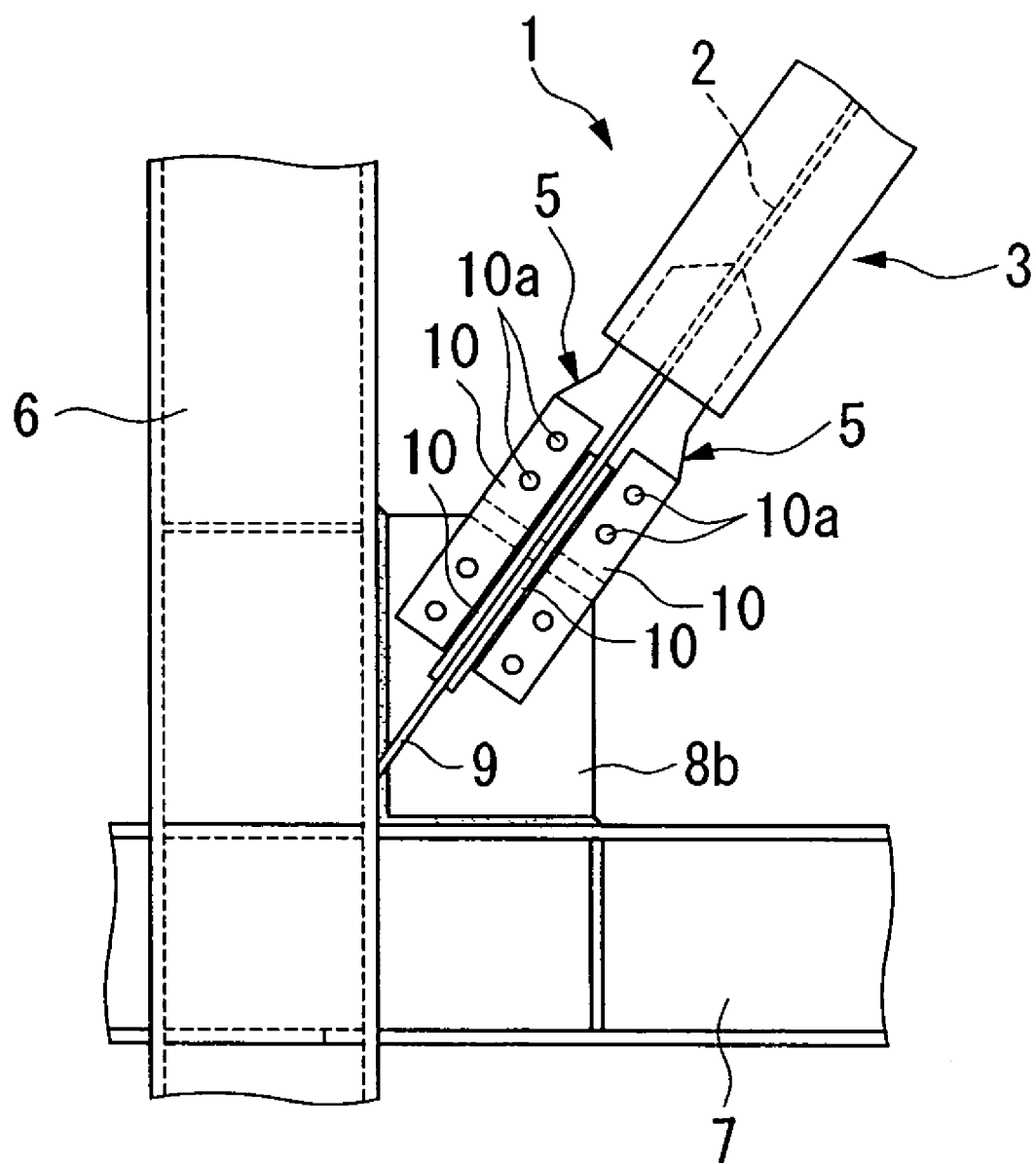
FIG. 8 is a front view of an alternative example showing the joint area between the damping brace and the structure according to the first embodiment of the present invention.

In this exemplary embodiment of the present invention, the plane of the axial force member 2 can be arranged to be parallel to the plane formed by the columns 6 and beams 7, and an equivalent effect can also be obtained when the plane of the axial force member 2 is arranged perpendicular to the plane formed by the columns 6 and beams 7. As shown in FIG. 8, the stiffening rib 5 and the gusset plate 8b can be tied together with bolts 10a, using two sets of paired splice plates 10 sandwiching two sides of the axial force member 2 at two locations. Similarly, the axial force member 2 and the out-of-plane rib 9 may be coupled together with bolts (not illustrated for the sake of clarity), using two sets of paired splice plates 10 surrounding two sides of the stiffening rib 5 at two locations.

Second Exemplary Embodiment

A second exemplary embodiment of the present invention will be described with reference to the drawings. Components already described in for the first exemplary embodiment of the present invention will be designated with the same symbols, and thus have already been described above.

Figure 9A:
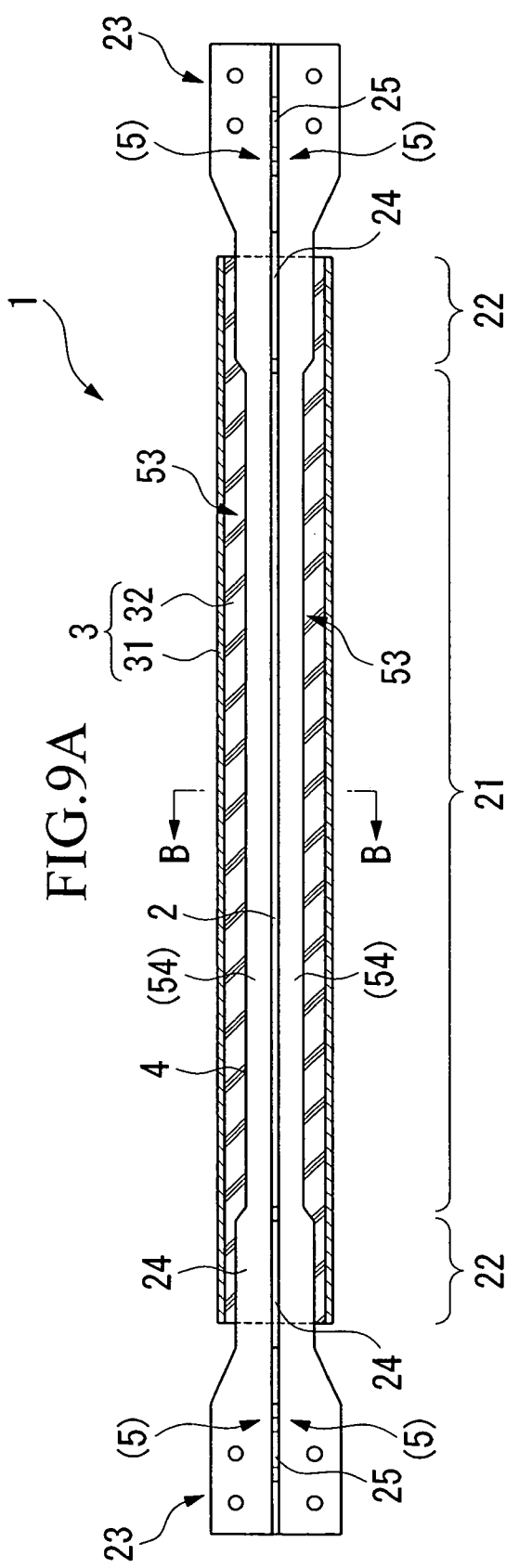
FIG. 9(A) is a traverse cross-sectional view of a second exemplary embodiment of the damping brace of the present invention.
Figure 9B:
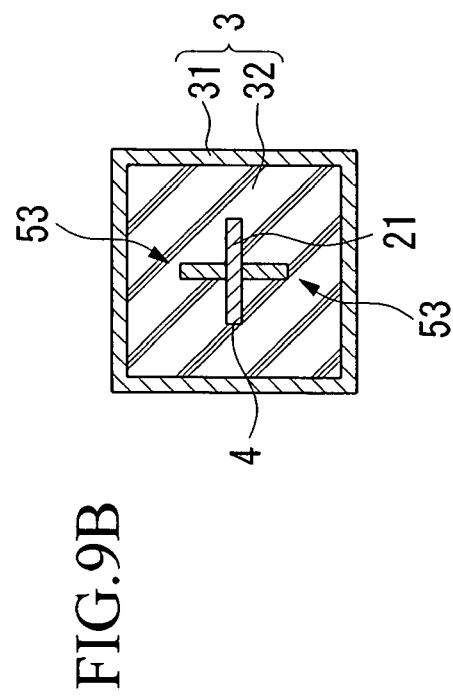
FIG. 9(B) is a cross-sectional view along the line B—B of the second embodiment shown in FIG. 9(A).

In the damping brace 1 of this exemplary embodiment, stiffening ribs 53 of approximately the same length as the axial force member 2 are provided, as shown in FIG. 9(A), (B). The stiffening ribs 53 are made from a steel sheet of uniform thickness just like the axial force member 2, and have a shape that links the two stiffening ribs 5 provided at the two external portion(s) of the axial force member 2 via a coupling bar 54 arranged along the yielding part 21. The stiffening ribs 53 are arranged on two sides of the axial force member 2, and are welded at the portion abutting on the axial force member 2 in the axial direction. The coupling bar 54 increases the stiffness of the yielding part 21 of the axial force member 2.

In the damping brace 1 of this embodiment, similarly to the first exemplary embodiment described above, the axial length L of the stiffening part 22 covered by the constraining member 3 is specified to be no less than 150 mm, and the size t of the gap between the lateral edge 5a of the stiffening ribs 5 and the concrete 32 is specified to be no more than 1 mm. The damping brace 1 of this embodiment can be set to the magnitude θ of the angle of rotation occurring at the external portion(s) of the axial force member 2 to no more than ⅕s rad, and may possibly prevent hinges from forming at the external portion(s) of the axial force member 2.

Figure 10:
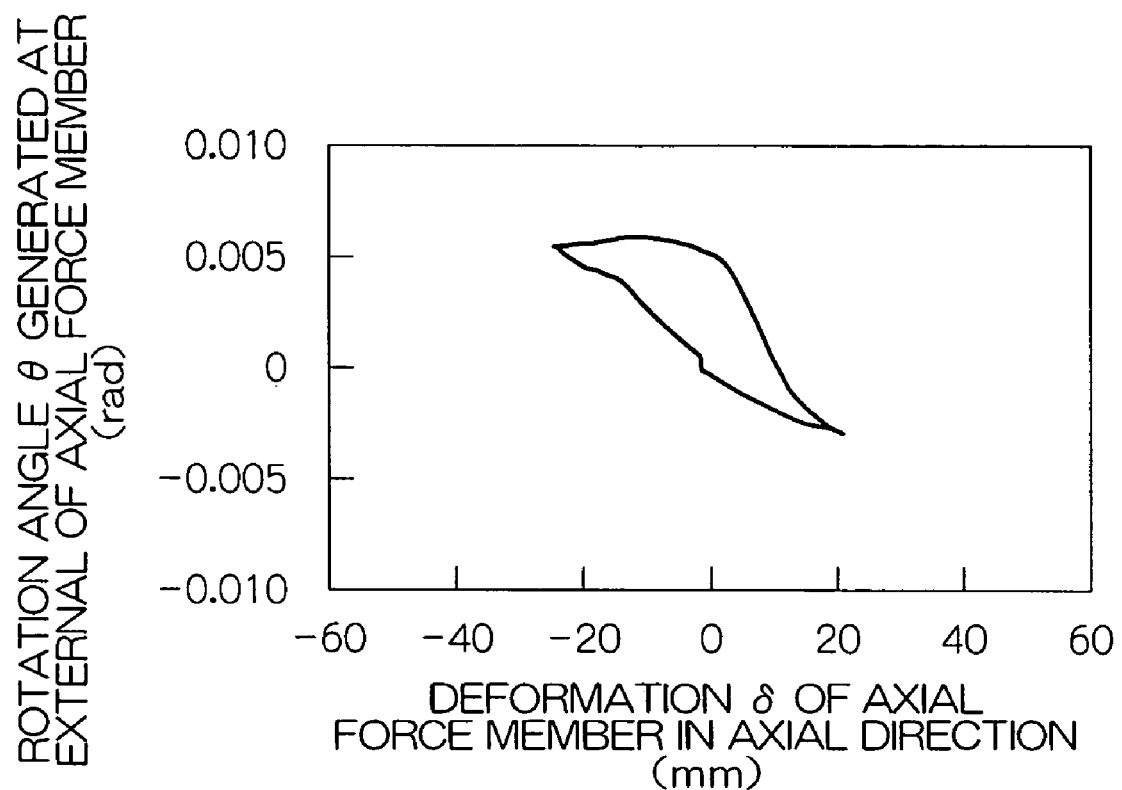
FIG. 10 is a diagram showing the relation between the amount of deformation δ of the axial member in the axial direction and a magnitude of the rotation angle θ generated at the external portion(s) of the axial force member when compressive and tensile forces are applied to cause an axial strain of 2% in the axial force member.

The experiment on the damping brace 1 of this exemplary embodiment has been performed in order to arrive at the specification for the axial length L of the stiffening part 22 covered by the constraining member 3 and the size t of the gap between the lateral edge 5a of the stiffening ribs 5 and the concrete 32 in the damping brace 1 of the present embodiment will be described. For example, the damping brace 1 was mounted onto a structure consisting of steel columns 6 and beams 7 by arranging the plane of the axial force member 2 parallel to the plane formed by the columns 6 and beams 7. The structure was then caused to undergo interstory deformation, subjecting the damping brace 1 to compressive and tensile forces with a 2% target axial strain of the axial force member 2, and the relationship between the axial deformation δ of the axial force member 2 and the magnitude of the angle of rotation θ occurring at the external portion(s) of the axial force member 2 was investigated. In this case as well, although the axial deformation δ of the axial force member 2 was smaller, the same tendency was observed as in the experiment conducted on the above-described first embodiment, as shown in FIG. 10.

Third Exemplary Embodiment

A third embodiment of the present invention will be described with reference to the drawings. Components already described in the preceding first and second embodiments will be designated with the same symbols, and thus have already been described above.

Figures 11A, 11B:
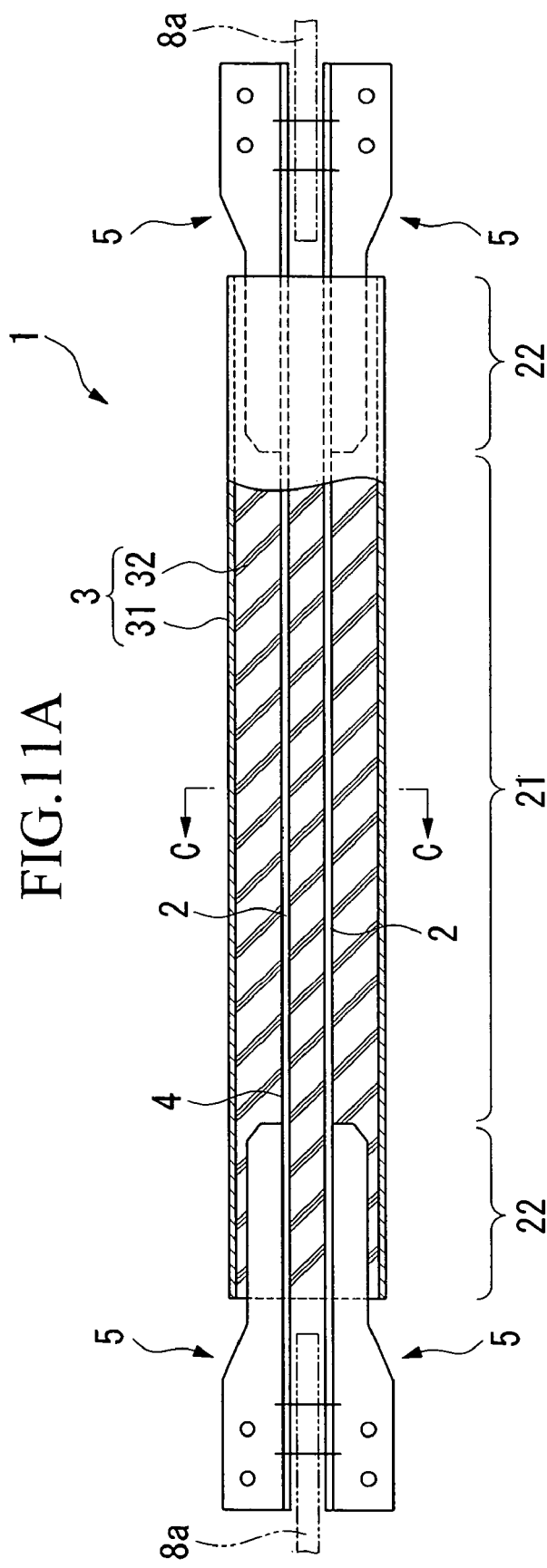
FIG. 11(A) is a traverse cross-sectional view of a third exemplary embodiment of the damping brace of the present invention.
FIG. 11(B) is a cross-sectional view along the line C—C of the third embodiment shown in FIG. 11(A).

In the damping brace 1 of this exemplary embodiment, two axial force members 2 are provided, as shown in FIG. 11(A), (B). These two axial force members 2 are arranged in parallel at an equal spacing, and each axial force member 2 is provided with one stiffening rib 5. When installing this damping brace 1 in a structure, a gusset plate 8a (or members 8b, 8c) is inserted between the external portion(s) of the two axial force members 2, which are bolted without using any splice plates. The stiffening ribs 5 may be bolted using splice plates.

Fourth Exemplary Embodiment

A fourth embodiment of the present invention will be described with reference to the drawings. Components already described in the preceding embodiments will be designated with the same symbols, and thus have already been described above.

Figure 12A:
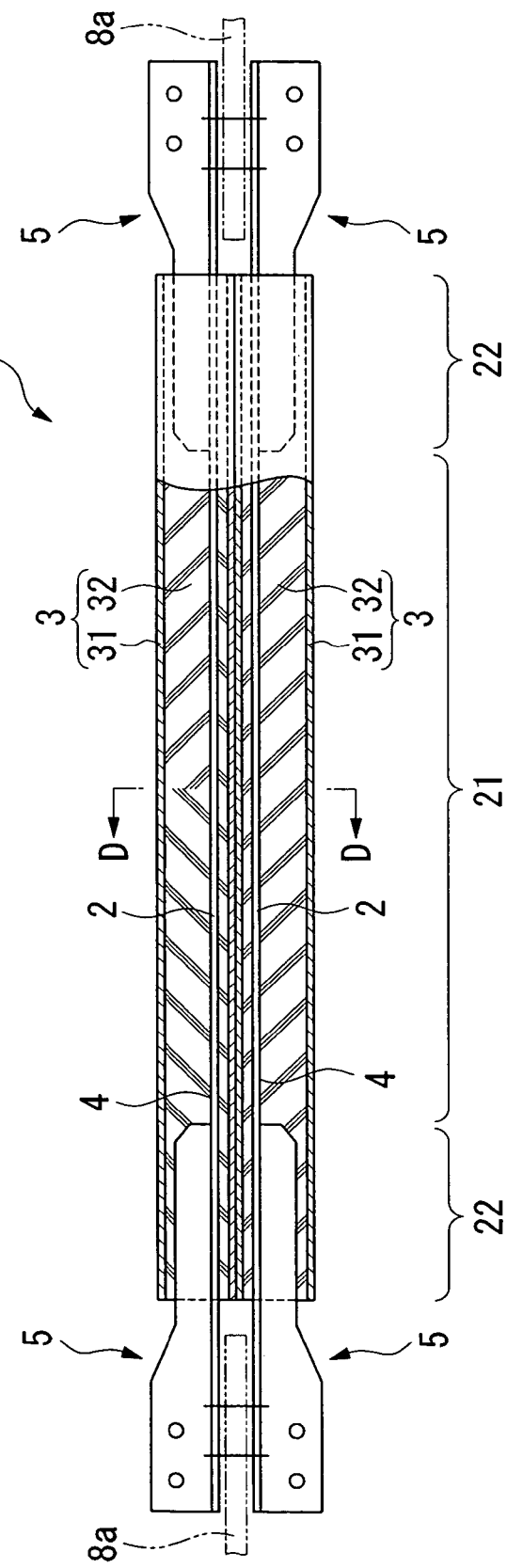
FIG. 12(A) is a traverse cross-sectional view of a fourth exemplary embodiment of the damping brace of the present invention.
Figure 12B:
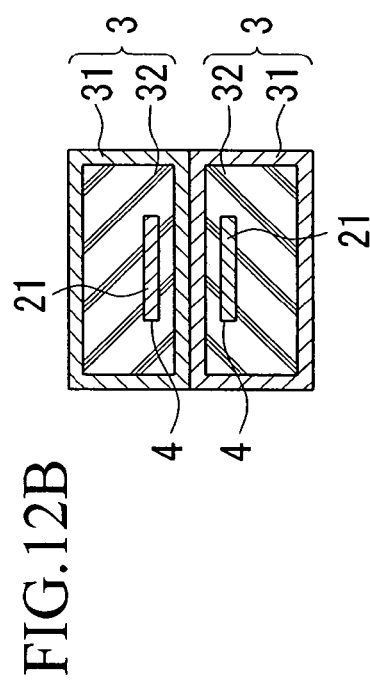
FIG. 12(B) is a cross-sectional view along the line D—D of the fourth embodiment shown in FIG. 12(A).

In the damping brace 1 of this exemplary embodiment as well, two axial force members 2 are provided, as shown in FIG. 12(A), (B), and one constraining member 3 is provided for each axial force member 2.

Fifth Exemplary Embodiment

A fifth embodiment of the present invention will be described with reference to the drawings. Components already described in the preceding embodiments will be designated with the same symbols, and thus have already been described above.

FIGS. 13(A) through 13(D) illustrate variations of the constraining member 3 shown in the above-described exemplary embodiments of the present invention. The constraining member 3a shown in FIG. 13(A) can be used as a replacement for the constraining member 3 of the first and second embodiments described above. This constraining member 3a combines two pieces of channel steel 33 and two pieces of flat steel 34. The pieces of channel steel 33 are arranged so as sandwich the yielding part 21 of the axial force member 2 between the rear surfaces of their webs. The pieces of flat steel 34 are arranged along the flange surfaces of adjacent pieces of channel steel 33, sandwiching the yielding part 21. The channel steel 33 and flat steel 34 are coupled together using bolts 35.

Figure 13A:
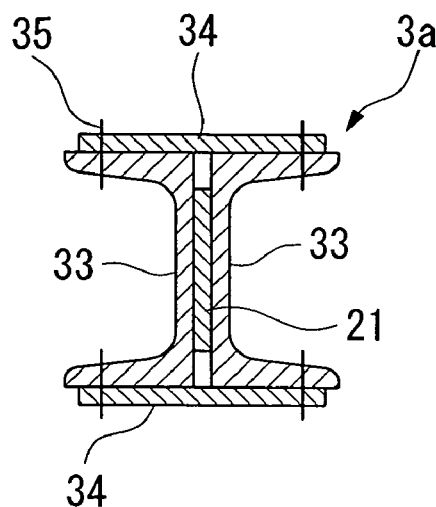
FIG. 13(A) is a first cross-sectional view of a fifth exemplary embodiment of the damping brace of constraining members of the previous exemplary embodiments.
Figure 13B:
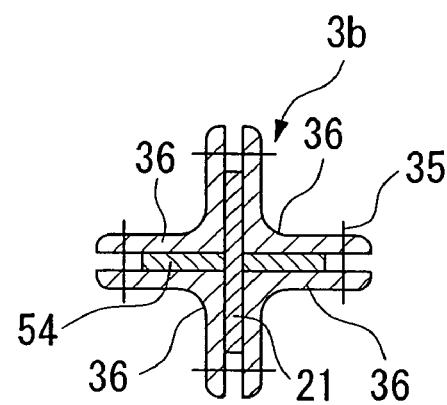
FIG. 13(B) is a second cross-sectional view of the fifth exemplary embodiment of the damping brace of constraining members of the previous exemplary embodiments.

The constraining member 3b shown in FIG. 13(B) can be used as a replacement for the constraining member 3 of the third embodiment described above. This constraining member 3b combines four pieces of angle steel 36. Each of the pieces of angle steel 36 is arranged so that its rear surface, which juts out in a right angle, lies against the right angle groove formed between the yielding part 21 and coupling bar 54. Each pair of adjoining pieces of angle steel 36 sandwiches either the yielding part 21 or the coupling bar 54 with their flange surfaces and is tied together using bolts 35.

Figure 13C:
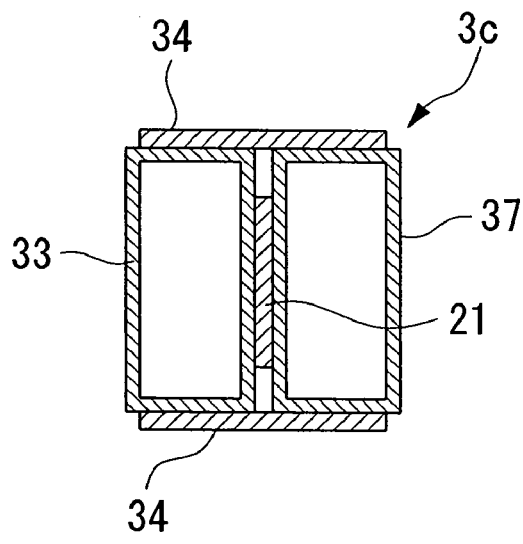
FIG. 13(C) is a third cross-sectional view of the fifth exemplary embodiment of the damping brace of constraining members of the previous exemplary embodiments.

The constraining member 3c shown in FIG. 13(C) can be used as a replacement for the constraining member 3 of the first and second embodiments described above. This constraining member 3c combines two pieces of box steel 37 and two pieces of flat steel 34. The pieces of box steel 37 are arranged so as to sandwich the yielding part 21 of the axial force member 2 between their lateral surfaces. The pieces of flat steel 34 are arranged along the lateral surfaces of adjacent pieces of box steel 37 sandwiching the yielding part 21. The pieces of box steel 37 and the pieces of flat steel 34 are secured by welding.

Figure 13D:
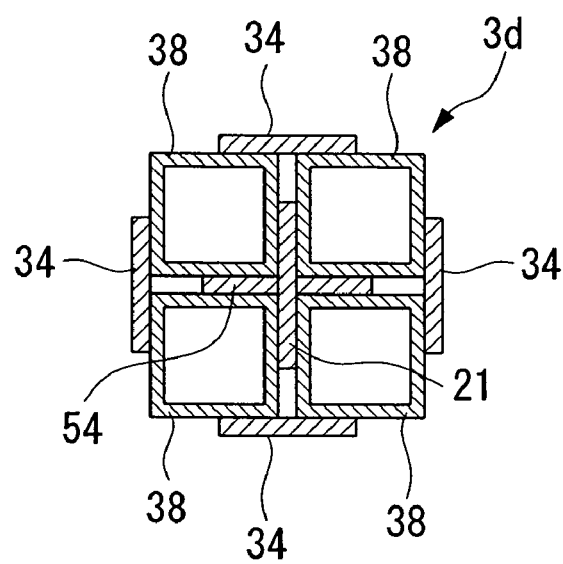
FIG. 13(D) is a fourth cross-sectional view of the fifth exemplary embodiment of the damping brace of constraining members of the previous exemplary embodiments.

The constraining member 3d shown in FIG. 13(D) can be used as a replacement for the constraining member 3 of the third embodiment described above. This constraining member 3d combines four pieces of box steel 38 having a rectangular cross-section and four pieces of flat steel 34. The pieces of box steel 38 are arranged so that their two adjacent lateral surfaces lie along the right angle groove surface formed between the yielding part 21 and the coupling bar 54. The pieces of flat steel 34 are arranged along the lateral surface of adjacent pieces of box steel 38 sandwiching the yielding part 21. The box steel 38 and flat steel 34 may be secured by welding.

Sixth Exemplary Embodiment

A sixth embodiment of the present invention will be described with reference to the drawings. Components already described in the preceding embodiments will be designated with the same symbols, and thus have already been described above.

Figure 14A:
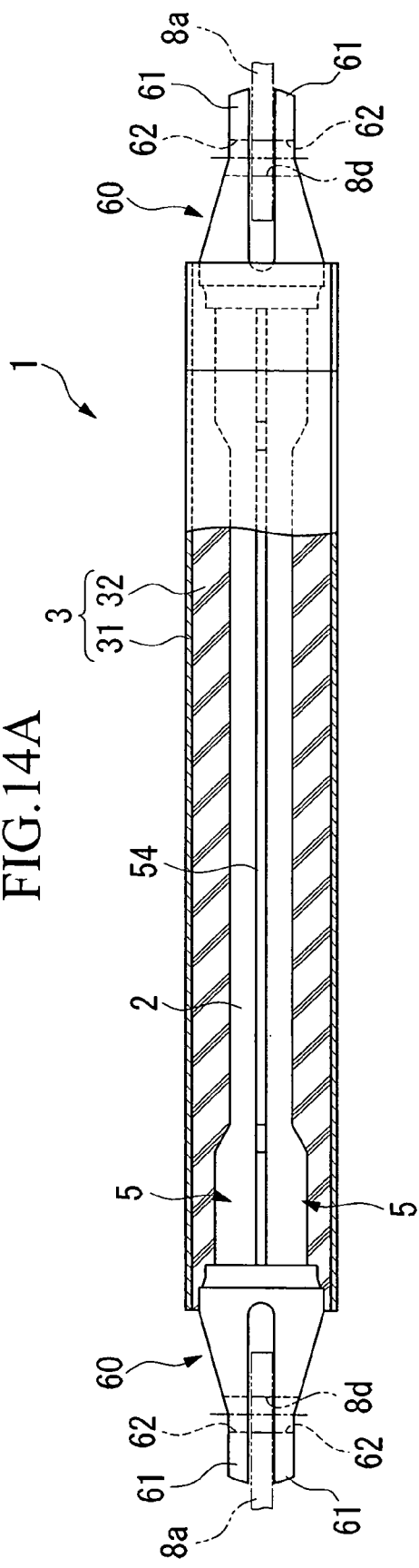
FIG. 14(A) is a vertical cross-sectional view of a sixth exemplary embodiment of the damping brace of the present invention.
Figure 14B:
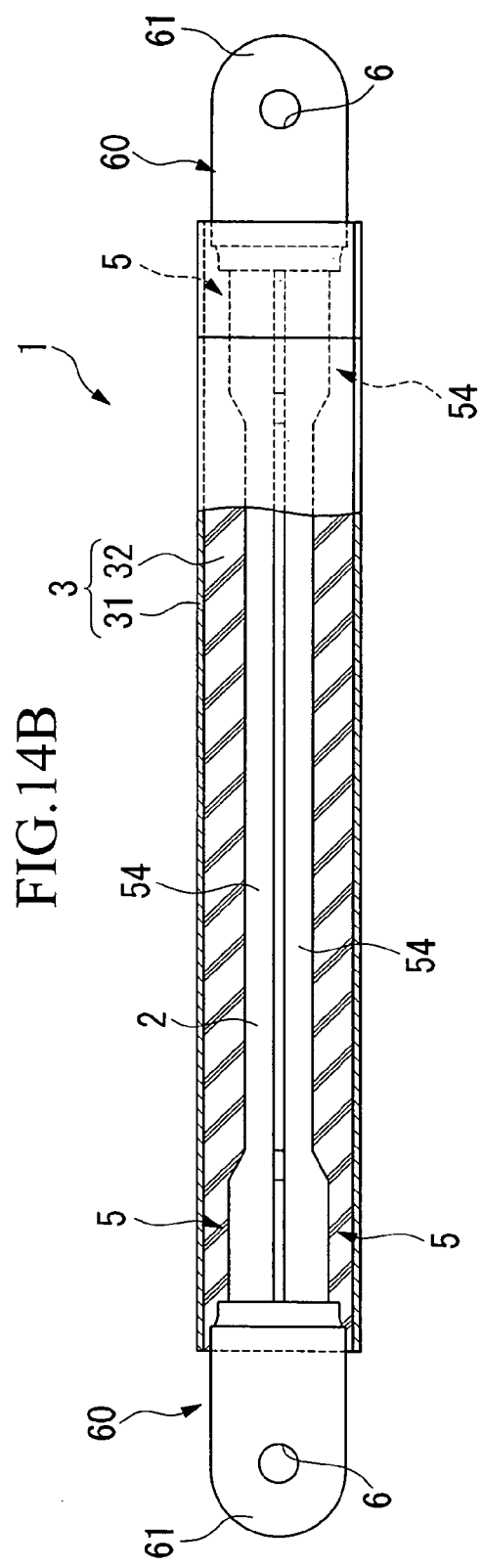
FIG. 14(B) is a horizontal cross-sectional view of the sixth embodiment shown in FIG. 14(A).

In the damping brace 1 of this exemplary embodiment, a pin joint block (pin coupling) 60 that is joined to a structure using pins is provided as the coupling part 23, as illustrated in FIGS. 14(A) and 14(B). The pin joint block 60 is provided with two axial support parts 61 running in parallel at a gap, and each axial support part 61 is provided with a pin hole 62.

When installing this damping brace 1 onto a structure, a gusset plate 8a (or elements 8b, 8c) can be inserted between the two axial support parts 61, and a pin (not illustrated for the sake of clarity) is mounted rotatably through the pin hole 62 and the pin hole 8d formed in the gusset plate 8a.

When a structure in which the damping brace is installed is subjected to vibrational energy due to earthquake, wind or the like and undergoes interstory deformation, if the external portion(s) of the damping brace are joined rigidly to the joint area between the columns 6 and beams 7 using splice plates 10, bending moment will be generated on the external portion(s) of the damping brace in the plane of the columns 6 and beams 7, while if the damping brace 1 is joined to the structure with pins, as described above, the external portion (s) of the damping brace 1 will rotate, so no bending moment will be generated and only either tensile or compressive forces will act upon the damping brace 1, thus making it possible for the damping brace 1 to fully exhibit its specific characteristics.

Seventh Exemplary Embodiment

A seventh embodiment of the present invention will be described with reference to the drawings. Components already described in the preceding exemplary embodiments will be designated with the same symbols, and thus have already been described above.

Figure 15:
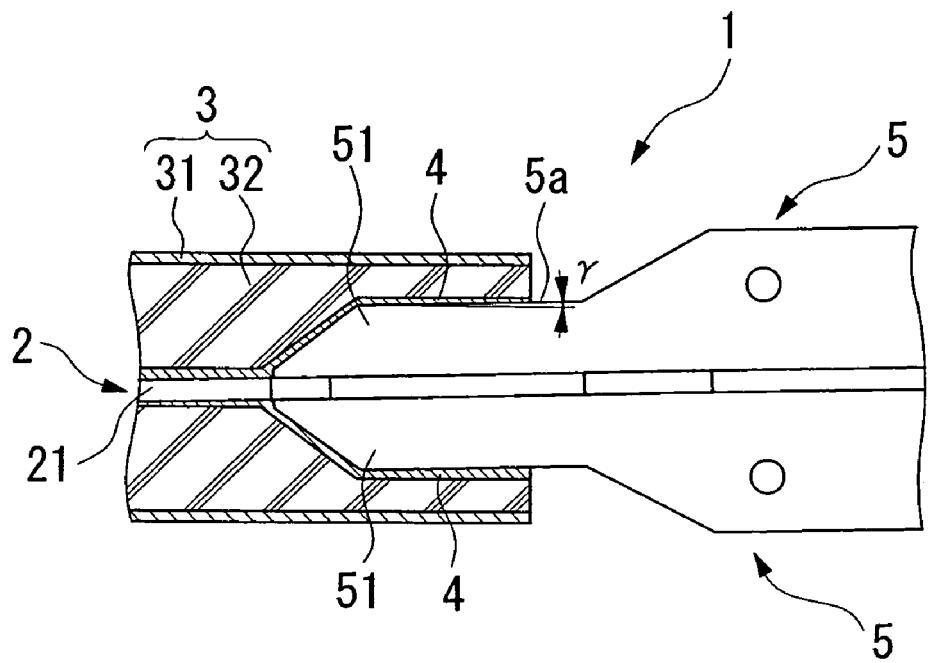
FIG. 15 is a vertical cross-sectional view of a seventh exemplary embodiment of the damping brace of the present invention.

In the damping brace 1 of this exemplary embodiment, the lateral edge 5a of the stiffening rib 5 is slanted so as to form an angle γ relative to the axial direction of the axial force member 2, as shown in FIG. 15. The inner surface of the concrete 32 in the constraining member 3 is also slanted to match the slant of the lateral edge 5a. This makes the gap between the lateral edge 5a of the stiffening rib 5 and the concrete 32 equal.

When a damping brace 1 configured as described above can be subjected to compressive forces, the axial force member 2 may be strained in the axial direction and the external portion(s) of the axial force member 2 are pushed into the inner side of the constraining member 3. This makes the size of the gap between the lateral edge 5a of the stiffening rib 5 and the concrete 32 smaller than in a state not subjected to compressive forces, so the angle of rotation θ occurring at the external portion(s) of the axial force member 2 also becomes smaller, preventing the formation of hinges at the external portion(s) of the axial force member 2.

Eighth Exemplary Embodiment

An eight embodiment of the present invention will be described with reference to the drawings. Components already described in the preceding embodiments will be designated with the same symbols, and thus have already been described above.

Figure 16:
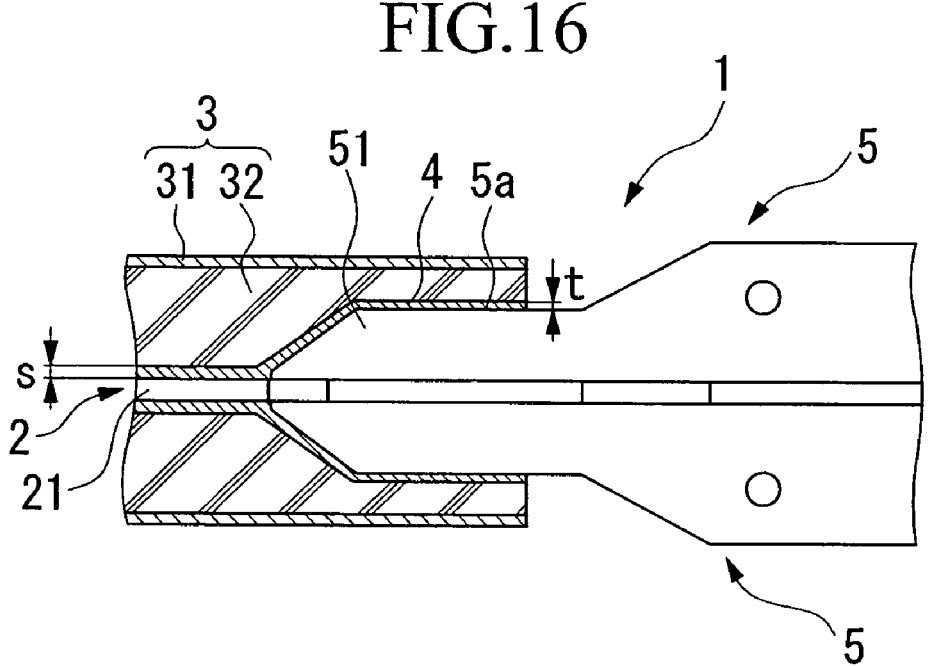
FIG. 16 is a vertical cross-sectional view of an eighth embodiment of the damping brace of the present invention.
Figure 17A:
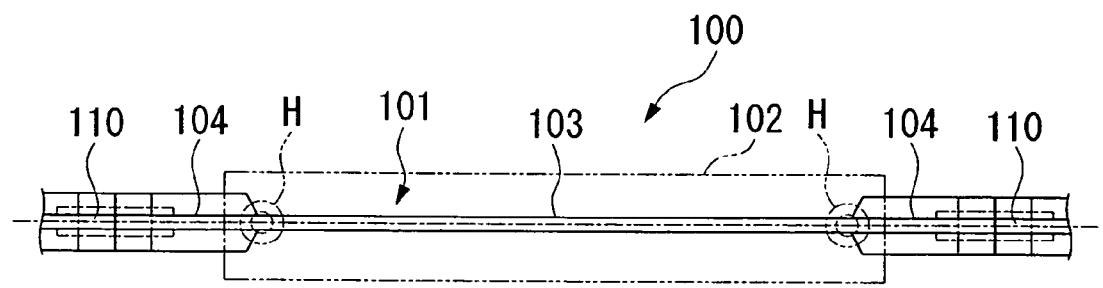
FIG. 17(A) is a schematic diagram showing a condition in which a damping brace is stable even though a compressive force is being applied to the damping brace.
Figure 17B:
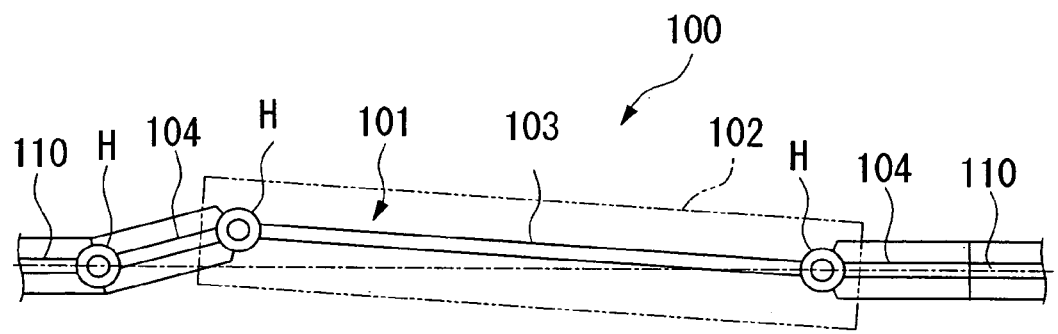
FIG. 17(B) is a first schematic diagram showing a condition where the performance of the damping brace has become unstable due to the hinge phenomenon when a compressive force is applied to the damping brace.
Figure 17C:
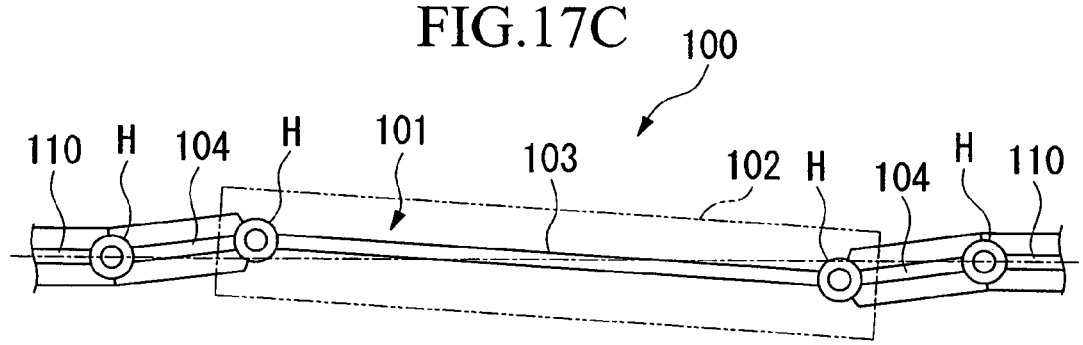
FIG. 17(C) is a second schematic diagram showing a condition where the performance of the damping brace has become unstable due to the hinge phenomenon when the compressive force is applied to the damping brace.

In the damping brace 1 of this exemplary embodiment, the size 1 of the gap between the yielding part 21 and the concrete element 32 can be greater than the size t of the gap between the lateral edge 5a of the stiffening rib 5 and the concrete element 32, as shown in FIG. 16.

When a damping brace 1 configured as described above is subjected to compressive forces, the stiffening rib 5 touches the concrete 32, constraining the behavior of the external portion(s) of the axial force member 2. Since the yielding part 21 does not touch the concrete 32 in this state, deformation in the axial direction of the axial force member 2 caused by compressive forces occurs smoothly, without meeting excessive resistance, so the damping brace 1 does not exhibit unstable behavior.

While the yielding part 21 of the axial force member 2 in the present embodiments had a rectangular cross-section, the cross-sectional shape of the axial force member in the present invention is not limited to a rectangular shape; various shapes can be used, such as round, hollow rectangular, hollow round, etc.

In these exemplary embodiments of the present invention, the constraining member 3 was formed from a combination of steel tube 31 and concrete 32; however, mortar may also be used instead of the concrete. The axial force member 2 was formed from a single steel sheet of uniform thickness; however, modifications may be made to the thickness of the axial force member, such as by making the thickness of the yielding part less than that of other areas. Furthermore, the axial force member may be formed by combining a plurality of steel sheets.

The foregoing merely illustrates the principles of the invention. Various modifications and alterations to the described embodiments will be apparent to those skilled in the art in view of the teachings herein. It will thus be appreciated that those skilled in the art will be able to devise numerous arrangements although not explicitly shown or described herein, embody the principles of the invention and are thus within the spirit and scope of the present invention.

What is claimed is:

1. A damping brace, comprising:
an axial force member configured to provide bearing forces against at least one of a tensile force and a compressive force that acting in an axial direction;
a constraining member provided around the axial force member so as to constrain the axial force member;
a stiffening part positioned at an end section of the axial force member so as to increase a stiffness of the damping brace; and an adhesion preventive coating provided between the constraining member and the stiffening part so as to prevent an adhesion therebetween, wherein a length of the stiffening part extending in the axial direction and a gap between the stiffening part and the constraining member as defined by the thickness of the preventive coating are configured so as to prevent an end of the axial force member from rotating and deviating from the axial direction beyond a predetermined angle when the compressive force is applied to the axial force member and wherein a gap between the axial force member and the constraining member as defined by the thickness of the preventive coating is greater than the gap between the stiffening part and the constraining member.

2. The damping brace of claim 1, wherein the predetermined angle is $1/75$ radian, and wherein the length of the stiffening part is at least 150 mm.

3. The damping brace of claim 2, wherein the gap between the constraining member and the stiffening part is at most 1 mm.

4. The damping brace of claim 1, wherein further comprising a pin joint configured to be joined to a structure is provided at an end of the axial force member.

5. The damping brace of claim 1, wherein the axial force member comprises:

a yielding part covered by the constraining member and which undergoes yielding absorbs energy where subjected to tensile or compressive forces above a certain magnitude; and a stiffening part which increases the stiffness of the yielding part protruding from the constraining member; further wherein a cross-section area of the stiffening part is larger than that of the yielding part.

6. A rigid structure, comprising:

an arrangement which is at least of columns and beams, the arrangement including a damping brace which comprises:

a. an axial force member configured to provide bearing forces against one of a tensile force and a compressive force that acting in an axial direction, b. a constraining member provided around the axial force member so as to constrain the axial force member, c. a stiffening part positioned at an end section of the axial force member, so as to increase a stiffness of the damping brace, and d. an adhesion preventive coating provided between the constraining member and the stiffening part so as to prevent an adhesion therebetween, wherein a length of the stiffening part extending along the axial direction and a gap between the stiffening part and the constraining member as defined by the thickness of the preventive coating are configured so as to prevent an end of the axial force member from rotating and deviating from the axial direction beyond a predetermined angle when the compressive force is applied to the axial force member, and wherein a gap between the axial force member and the constraining member as defined by the thickness of the preventive coating is greater than the gap between the stiffening part and the constraining member.

7. The rigid structure of claim 6, wherein the damping brace is pin-jointed to the rigid structure.

* * * * *

UNITED STATES PATENT AND TRADEMARK OFFICE
CERTIFICATE OF CORRECTION

| | | |
|---|---|---|
| PATENT NO. | : 7,225,588 B2 | Page 1 of 1 |
| APPLICATION NO. | : 10/883937 | |
| DATED | : June 5, 2007 | |
| INVENTOR(S) | : Nakamura et al. | |

It is certified that error appears in the above-identified patent and that said Letters Patent is hereby corrected as shown below:

In the Specification:

Please make the following corrections:

Column 2, line 28, replace "1101" with --101--,

Column 12, line 18, replace "size 1" with --size s--

Signed and Sealed this

Twenty-eighth Day of August, 2007

JON W. DUDAS
*Director of the United States Patent and Trademark Office*